(12) United States Patent
Kuwabara

(10) Patent No.: US 8,430,413 B2
(45) Date of Patent: Apr. 30, 2013

(54) VEHICLE

(75) Inventor: Naoki Kuwabara, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 92 days.

(21) Appl. No.: 13/196,460

(22) Filed: Aug. 2, 2011

(65) Prior Publication Data

US 2012/0032411 A1 Feb. 9, 2012

(30) Foreign Application Priority Data

Aug. 5, 2010 (JP) ................................. 2010-176729

(51) Int. Cl.
*B60G 15/00* (2006.01)
(52) U.S. Cl.
USPC .................................................. 280/124.155
(58) Field of Classification Search ............... 280/93.51, 280/93.511, 93.512, 93.513, 124.134, 124.145, 280/124.146, 124.154, 124.155
See application file for complete search history.

(56) References Cited

U.S. PATENT DOCUMENTS

| | | | | |
|---|---|---|---|---|
| 4,778,198 A | * | 10/1988 | Gold ....................... | 280/124.147 |
| 4,878,683 A | * | 11/1989 | Dever ........................... | 180/253 |
| 5,018,757 A | * | 5/1991 | Kozuka ....................... | 280/5.523 |
| 5,938,219 A | * | 8/1999 | Hayami et al. .......... | 280/124.135 |
| 6,027,130 A | * | 2/2000 | Kawabe et al. ......... | 280/124.135 |
| 7,490,840 B2 | * | 2/2009 | Luttinen et al. ........... | 280/93.512 |
| 7,648,304 B2 | * | 1/2010 | Wolf .............................. | 403/134 |
| 2003/0234504 A1 | * | 12/2003 | Frantzen ................... | 280/93.512 |
| 2006/0290088 A1 | * | 12/2006 | Luttinen et al. ............ | 280/93.51 |
| 2007/0045036 A1 | * | 3/2007 | Takeuchi et al. .............. | 180/411 |

FOREIGN PATENT DOCUMENTS

| | | |
|---|---|---|
| JP | 61-146609 A | 7/1986 |
| JP | 2008302813 A1 * | 12/2008 |

* cited by examiner

*Primary Examiner* — Paul N Dickson
*Assistant Examiner* — Robert A Coker
(74) *Attorney, Agent, or Firm* — Westerman, Hattori, Daniels & Adrian, LLP

(57) ABSTRACT

A vehicle, such as an all terrain vehicle, has a structure with which an increase in the weight of a strut damper can be suppressed. A strut damper axis is disposed to be along an imaginary line formed by imaginarily interconnecting an intersection at which a vertical line passing through a grounding point of a wheel intersects an extension line of a lower arm and a connection point at which the strut damper is connected to a vehicle body. A reaction force from a road surface is input to the strut damper substantially along the strut damper axis. Since no bending force is exerted on the strut damper, the strut damper can be made smaller in size, and the strut damper can be made lighter in weight.

20 Claims, 5 Drawing Sheets

VEHICLE

This application claims the benefit of Japanese application JP2010-176729, the contents of which are incorporated by reference.

TECHNICAL FIELD

The present invention relates to a vehicle, particularly to an all terrain vehicle.

BACKGROUND OF THE INVENTION

An all terrain vehicle including a suspension system in which a strut damper is provided with a knuckle holder and a knuckle is rotatably (steerably) mounted to the knuckle holder has been proposed (see, for example, Japanese Patent Laid-Open No. Sho 61-146609).

As shown in FIG. 4 of Japanese Patent Laid-Open No. Sho 61-146609, a strut damper axis and a kingpin axis are juxtaposedly arranged, with an offset therebetween in the vehicle width direction.

A reaction force from a road surface is transmitted through a front wheel, a knuckle, a support member, and a shock absorber. As seen from the figure, when a road surface reaction force is inputted, a bending load is exerted on the shock absorber. In order to endure the bending, it may be necessary to adopt a robust structure in which, for example, a damper shaft in the shock absorber is enlarged in diameter or the shock absorber is enlarged in diameter.

When the shock absorber is enlarged in diameter, its weight is increased, leading to an increase in vehicle weight, which is undesirable.

In view of this, there is a demand for a structure with which it is possible to suppress an increase in the weight of a shock absorber, or in the weight of a strut damper.

SUMMARY OF THE INVENTION

A structure is provided with which it is possible to suppress an increase in the weight of a strut damper, in a vehicle, particularly an all terrain vehicle.

According to a first aspect, there is provided a vehicle including a body frame, a power generating engine mounted to the body frame and operable to generate power, strut dampers each of which is connected at its upper end to the body frame and extends downward, arched knuckle holders each of which is mounted to a lower portion of the strut damper and is opened to the vehicle front side or rear side, lower arms each of which extends in the vehicle width direction and connects a lower portion of the knuckle holder to the body frame, and knuckles each of which is turnably connected to the knuckle holder through upper and lower kingpins and supports a wheel, wherein a lower end portion of the strut damper is located on the upper side of the upper kingpin, and at least a part of the upper kingpin overlaps with the lower end portion of the strut damper in plan view.

In a second aspect, the strut damper is provided, on the inner side in the vehicle width direction relative to a strut damper axis, with a damper-side connection section for connection to the knuckle holder, the knuckle holder is provided with a holder-side connection section on the inner side in the vehicle width direction relative to a kingpin axis, and the damper-side connection section is fastened to the holder-side connection section.

In a third aspect, a gap with a predetermined length is provided between the lower end portion of the strut damper and an upper surface of the upper kingpin.

In a fourth aspect, in front view of the vehicle, the strut damper axis is disposed to be along an imaginary line formed by imaginarily interconnecting an intersection at which a vertical line passing through a grounding point of the wheel intersects an extension line of the lower arm and a connection point at which the strut damper is connected to the vehicle body.

In a fifth aspect, in front view of the vehicle, the strut damper axis is disposed to be substantially along an imaginary line formed by imaginarily interconnecting an intersection at which a vertical line passing through a grounding point of the wheel intersects an extension line of the lower arm and a connection point at which the strut damper is connected to the vehicle body; and the strut damper axis is so inclined that its upper portion intersects the imaginary line and its lower portion is spaced from the imaginary line toward the inner side in the vehicle width direction.

In a sixth aspect, the lower arm is so disposed that the lower arm is connected to the body frame at two parts thereof consisting of a front mounting section and a rear mounting section, and that the strut damper axis is substantially orthogonal to a longitudinal line interconnecting the front mounting section and the rear mounting section; and in side view of the vehicle, the kingpin axis is disposed to be inclined relative to a vertical line passing through a grounding point of the wheel so that its upper portion is located on the vehicle rear side in relation to the vertical line, and the strut damper axis is disposed to be inclined relative to the kingpin axis so that its upper portion is located on the vehicle rear side in relation to the kingpin axis.

In a seventh aspect, the knuckle has an upper arm at an upper portion thereof and a lower arm at a lower portion thereof; the knuckle holder has an upper shaft support section for rotatably supporting the upper arm and a lower shaft support section for rotatably supporting the lower arm; the upper arm is put into contact with the upper shaft support section from below and is rotatably fastened to the upper shaft support section by a bolt inserted along a kingpin axis from above; and the lower arm is put into contact with the lower shaft support section from below and is rotatably fastened to the lower shaft support section by a dowel inserted along the kingpin axis from below.

In an eighth aspect, a detachable reinforcing member is mounted to an opening of the knuckle holder, which has an arched shape opened to the front or rear side of the vehicle.

According to the first aspect, the kingpin axis as the center axis of the upper and lower kingpins is set close to the strut damper axis as the center axis of the strut damper.

As a result, the road surface reaction force is inputted to the strut damper substantially along the strut damper axis. Since only little bending force is exerted on the strut damper, the strut damper can be made smaller in diameter, so that the strut damper can be made lighter in weight.

According to the second aspect, the damper-side connection section and the holder-side connection section are disposed on the inner wide in the vehicle width direction relative to the wheel, so that the damper-side connection section and the holder-side connection section are made less liable to interfere with the wheel. As a result, it is possible to set the strut damper closer to the side of the road surface reaction force input point and to reduce the bending load on the strut damper, while obviating the interference of the strut damper with the wheel.

According to the third aspect, the gap is provided, so that it is possible by utilizing the gap to turn the bolt as the upper kingpin with a fastening tool.

According to the fourth aspect, the strut damper axis is set to overlap with the imaginary line. Since the road surface reaction force can be absorbed by the strut damper and the bending load on the strut damper can be reduced, it is unnecessary to provide the strut damper with an excessively high rigidity. Consequently, reductions in the weight and size of the strut damper can be promoted.

According to the fifth aspect, the strut damper axis is inclined so that its upper portion intersects the imaginary line and its lower portion is spaced from the imaginary line toward the inner side in the vehicle width direction.

With the strut damper axis inclined toward the inner side in the vehicle width direction in relation to the imaginary line, the strut damper can be set closer to the vertical while obviating the interference of the strut damper with the wheel.

According to the sixth aspect, in plan view, the strut damper axis is disposed to be substantially orthogonal to the longitudinal line interconnecting the front mounting section and the rear mounting section of the lower arm. Besides, in side view of the vehicle, the kingpin axis is disposed to be inclined so that its upper portion is located on the vehicle rear side in relation to the vertical line passing through the grounding point of the wheel, and the strut damper axis is disposed to be inclined so that its upper portion is located on the vehicle rear side in relation to the kingpin axis.

The reaction force inputted to the wheel from the vehicle front side during forward running of the vehicle can be effectively absorbed into the strut damper, while making the effort to achieve steering lighter.

According to the seventh aspect, the knuckle has the upper arm at an upper portion thereof and the lower arm at a lower portion thereof, whereas the knuckle holder has the upper shaft support section for rotatably supporting the upper arm and the lower shaft support section for rotatably supporting the lower arm; the upper arm is put into contact with the upper shaft support section from below and is rotatably fastened to the upper shaft support section by the bolt inserted along the kingpin axis from above; and the lower arm is put into contact with the lower shaft support section from below and is rotatably fastened to the lower shaft support section by the dowel inserted along the kingpin axis from below.

This structure ensures that the knuckle as the rotating body can be more spaced from the strut damper, and, therefore, the fear that the knuckle might interfere with the strut damper can be eliminated.

In addition, according to the just-mentioned configuration, the bolt is untightened at the time of separating the knuckle from the knuckle holder. Then, the knuckle is lowered relative to the knuckle holder, and the dowel is disengaged from the knuckle holder, whereon the knuckle can be easily separated from the knuckle holder.

According to the eighth aspect, the detachable reinforcing member is mounted to the opening of the knuckle holder, which has an arched shape opened to the front or rear side of the vehicle.

With the opening reinforced with the reinforcing member, the size of the opening is kept constant, and a reduction in the weight of the knuckle holder can be contrived.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present invention will be described below, based on the accompanying drawings. Incidentally, the drawings are to be viewed according to the posture of reference symbols.

An embodiment of the present invention will be described, based on the drawings.

Figure 1:
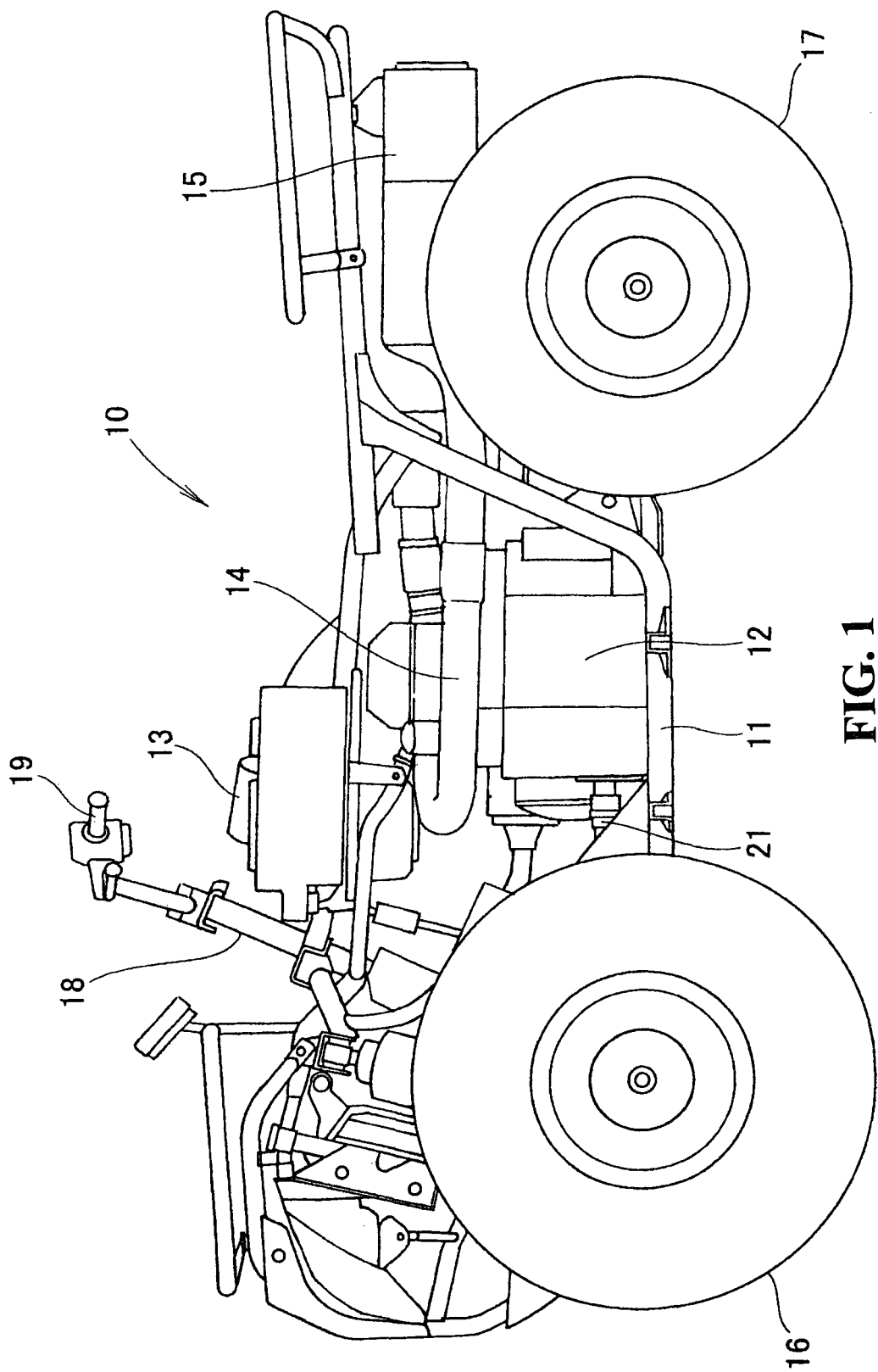
FIG. 1 is a left side view of a vehicle.

As shown in FIG. 1, a vehicle 10 is a small-type vehicle including a power generating engine 12 such as a gasoline engine in the center of a body frame 11, wherein air sucked in through an air cleaner 13 provided on the body frame 11 is mixed with a fuel, the fuel is combusted in the power generating engine 12, an exhaust gas is exhausted to the exterior through an exhaust pipe 14 extended from the power generating engine 12 and through a muffler 15 connected to the rear end of the exhaust pipe 14, the power thus obtained is transmitted to front wheels 16 rotatably mounted to front lower portions of the body frame 11 and/or rear wheels 17 rotatably mounted to rear lower portions of the body frame 11, whereby the vehicle is permitted to run, and the vehicle can be steered by a steering shaft 18 rotatably mounted to a front upper portion of the body frame 11 and a handle 19 for rotating the steering shaft 18.

The power generating engine 12 may be of any kind, insofar as it is a drive source such as a gasoline engine, a diesel engine, an electric motor, etc. The power generated in the power generating engine 12 is transmitted to a final reduction gear (symbol 22 in FIG. 2) through a transmission system 21.

Where the front wheels 16 and the rear wheels 17 are special tires with large width and low pressure, called balloon tires, ruggedness in road surfaces is absorbed by the tires through deformation of the tires, and, even when the road surface is soft, sinking of the vehicle can be suppressed by the large-width tires. Accordingly, such a vehicle 10 is called an all terrain vehicle.

Figure 2:
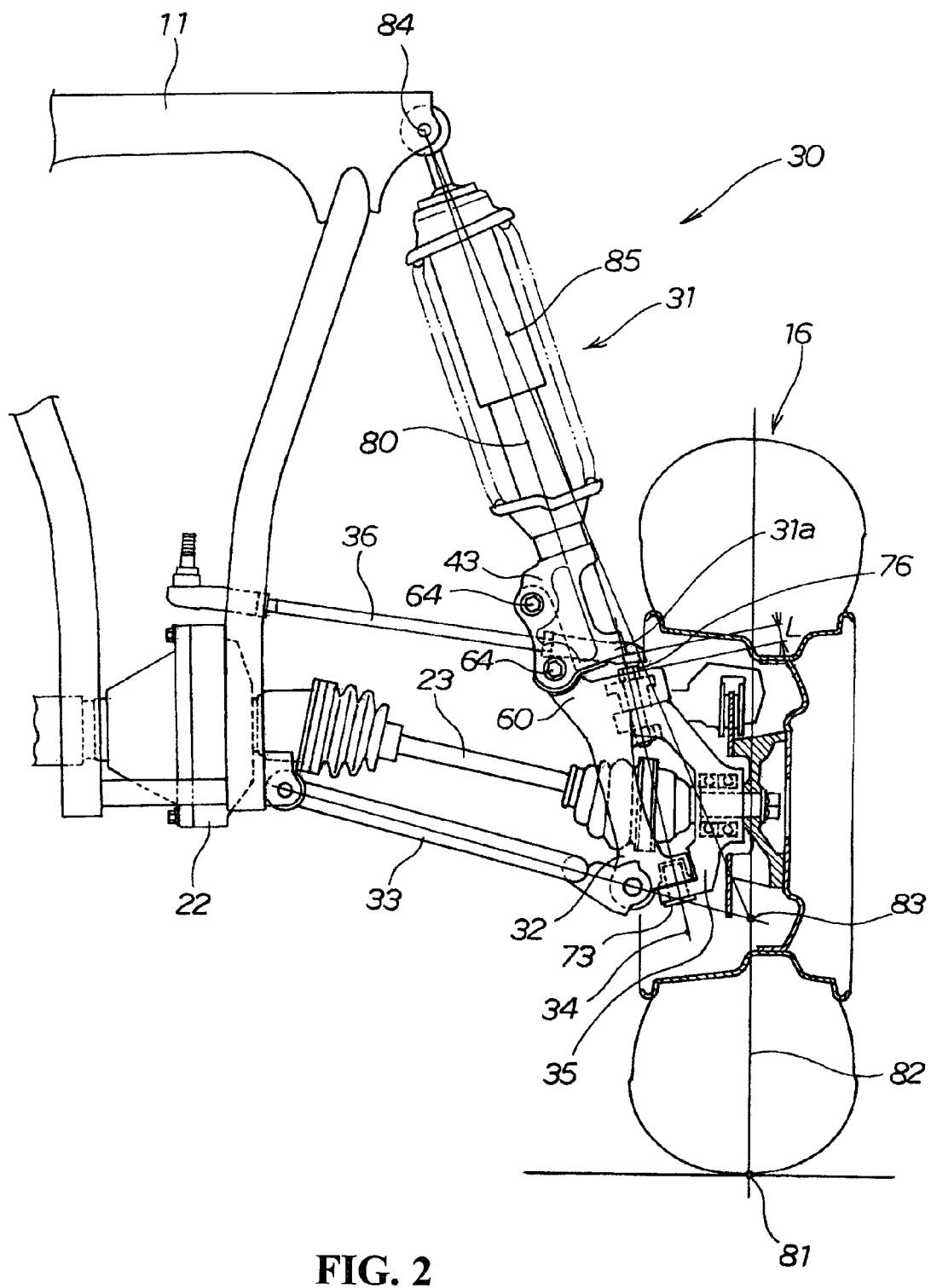
FIG. 2 is a front view of a suspension system for a wheel.

As shown in FIG. 2, the power is transmitted to the front wheels 16 through a drive shaft 23 extending in the vehicle width direction from the final reduction gear 22, whereby the front wheels 16 are rotationally driven.

A suspension system 30 for the wheel includes a strut damper 31 connected at its upper end to the body frame 11 and extending downward, a knuckle holder 32 extending downward from a lower portion of the strut damper 31, a lower arm 33 which extends in the vehicle width direction and which connects a lower portion of the knuckle holder 32 to the body frame 11, a knuckle 35 which is mounted to the knuckle holder 32 so as to be rotatable about a king pin axis 34 and which supports the front wheel 16, and a tie rod 36 which extends in the vehicle width direction and which rotates the knuckle 35 about the king pin axis 34. Now, details of the components will be described below.

Figure 3:
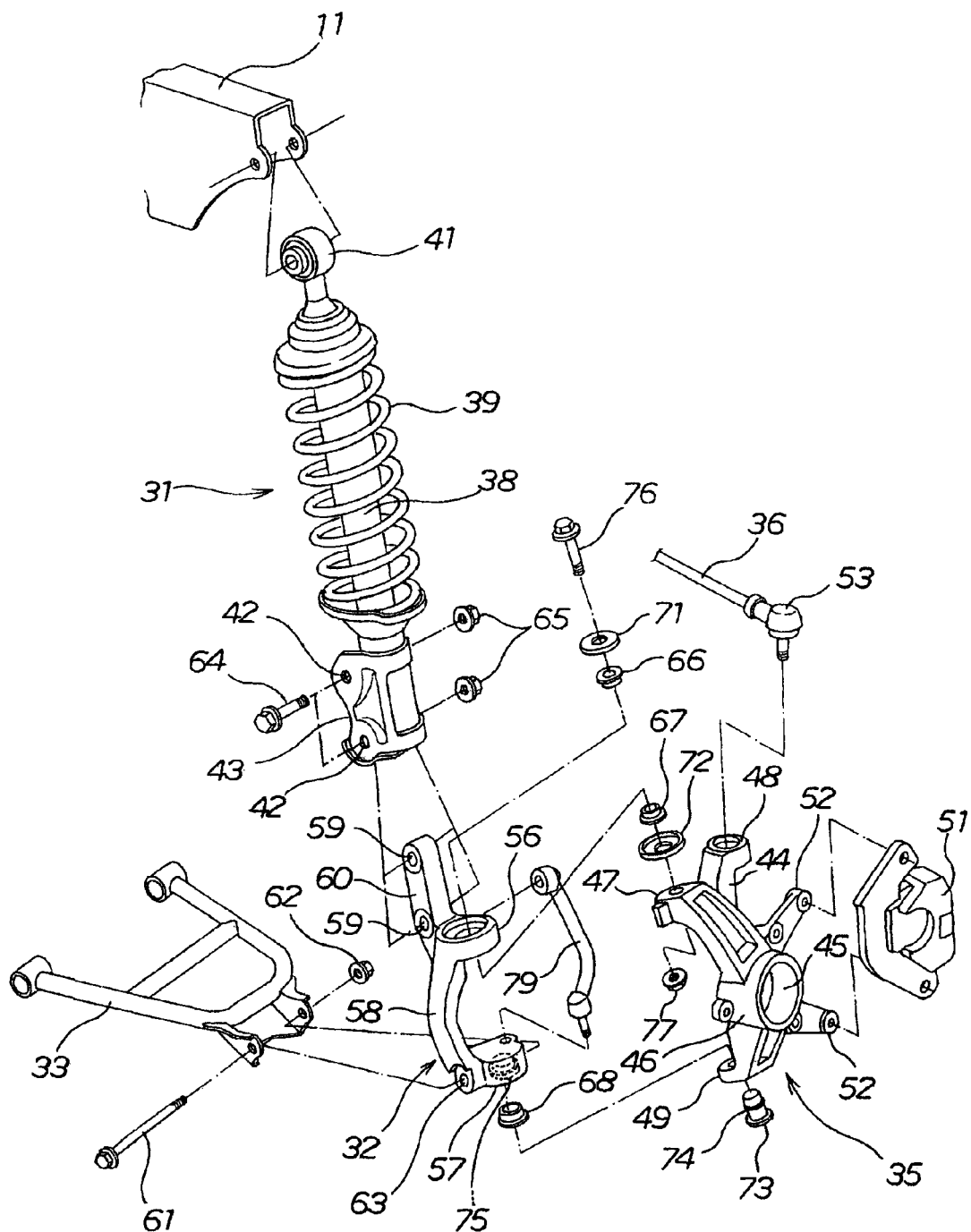
FIG. 3 is an exploded perspective view of the suspension system for the wheel.

As shown in FIG. 3, the strut damper 31 includes a damper section 38 for damping impact forces, and a spring 39 which is provided so as to surround the damper section 38 and by which the damper 38 having been contracted is returned to its original length, and an upper end portion 41 of the damper section 38 is detachably connected to the body frame 11. In addition, a vertically elongated damper-side connection section 43 formed with a plurality of (in this embodiment, two) bolt holes 42, 42 is provided at a lower portion of the damper section 38.

The knuckle 35 is an integrally formed part in which an upper arm 47 and an extension section 44 extend upward from a boss section 46 provided with a center hole 45, a lower arm 49 extends downward from the boss section 46, and caliper support sections 52, 52 for supporting a brake caliper 51 are extended sideways from the boss section 46.

The extension section 44 extends in the front-rear direction of the vehicle, and has a tie rod support section 48. A spherical joint 53 at the tip of the tie rod 36 is linked to the tie rod support section 48.

The lower arm 33 is a pipe part having an A-shaped form in plan view, for example.

The knuckle holder 32 is an arched member which includes an upper shaft support section 56 for supporting an upper portion (upper arm 47) of the knuckle 35, a lower shaft support section 57 for supporting a lower portion (lower arm 49) of the knuckle 35, and a bridge section 58 interconnecting the upper shaft support section 56 and the lower shaft support section 57. A holder-side connection section 60 extending upward from the bridge section 58 is provided with bolt holes 59, 59 penetrating in the front-rear direction of the vehicle, and the knuckle holder 35 is provided in its lower portion with a bolt hole 63 for connection to the lower arm 33 by a bolt 61 and a nut 62.

An upper portion of the knuckle holder 32 is connected to a lower portion of the damper section 38 by setting the holder-side connection section 60 along the damper-side connection section 43, passing bolts 64, 64 through the bolt holes 42, 42 and the bolt holes 59, 59, and fastening the nuts 65, 65.

Bushes 66, 67 L-shaped in section are mounted to the upper shaft support section 56, and a bush 68 L-shaped in section is mounted to the lower shaft support section 57. Then, a pressure lid 71 with a sealer is mounted to the bush 66 from above, and a pressure lid 72 with a sealer is mounted to the bush 67 from below.

At this time point, a drive shaft (symbol 23 in FIG. 2) is not yet mounted to the knuckle 35. A dowel 73 as a lower kingpin is upwardly inserted from below into the lower arm 49 of the knuckle 35 indicated by imaginary line, and a retaining ring 74 is fitted onto an intermediate portion of the dowel 73 which is in the shape of a headed pin. This prevents the dowel 73 from falling off from the lower arm 49. Then, the knuckle holder 32 as a whole is raised. By the raising, the dowel 73 is inserted into a slit 75 in the lower shaft support section 57, and the upper arm 47 is put into contact with the upper shaft support section 56 from below.

A bolt 76 as an upper kingpin is inserted from above into the bushes 66, 67 L-shaped in section, and is further let penetrate the upper arm 47. Then, a nut 77 is fastened to the bolt 76.

Thus, a structure is adopted in which the upper arm 47 of the knuckle 35 is put into contact with the upper shaft support section 56 of the knuckle holder 32 from below, and the lower arm 49 of the knuckle 35 is put into contact with the lower shaft support section 57 of the knuckle holder 32 from below.

This structure ensures that, as shown in FIG. 2, the knuckle 35 as a rotating body can be spaced farther from the strut damper 31, and there is no fear that the knuckle 35 might interfere with the strut damper 31. As a result, the strut damper 31 can easily be set close to the wheel 16.

Besides, according to the above-mentioned configuration, at the time of separating the knuckle 35 from the knuckle holder 32 in FIG. 3, the bolt 76 is untightened. Consequently, the knuckle 35 is lowered in relation to the knuckle holder 32, and then the dowel 73 is disengaged from the knuckle holder 32, whereon the knuckle 35 can be separated from the knuckle holder 32.

In addition, the knuckle holder 32 having an arched shape opening to the rear side is desirably fitted with a reinforcing member 79 which can be detachably attached to the opening.

When an upward or downward force is exerted on the upper shaft support section 56 and/or the lower shaft support section 57, the lower shaft support section 57 may be moved toward or away from the upper shaft support section 56, resulting in a change in the size of the opening.

As a countermeasure against this problem, it may be contemplated to increase the diametral size of the bridge section 58. However, there is a fear that an increase in the diametral size may lead to an increase in the weight of the knuckle holder 32.

Figure 5:
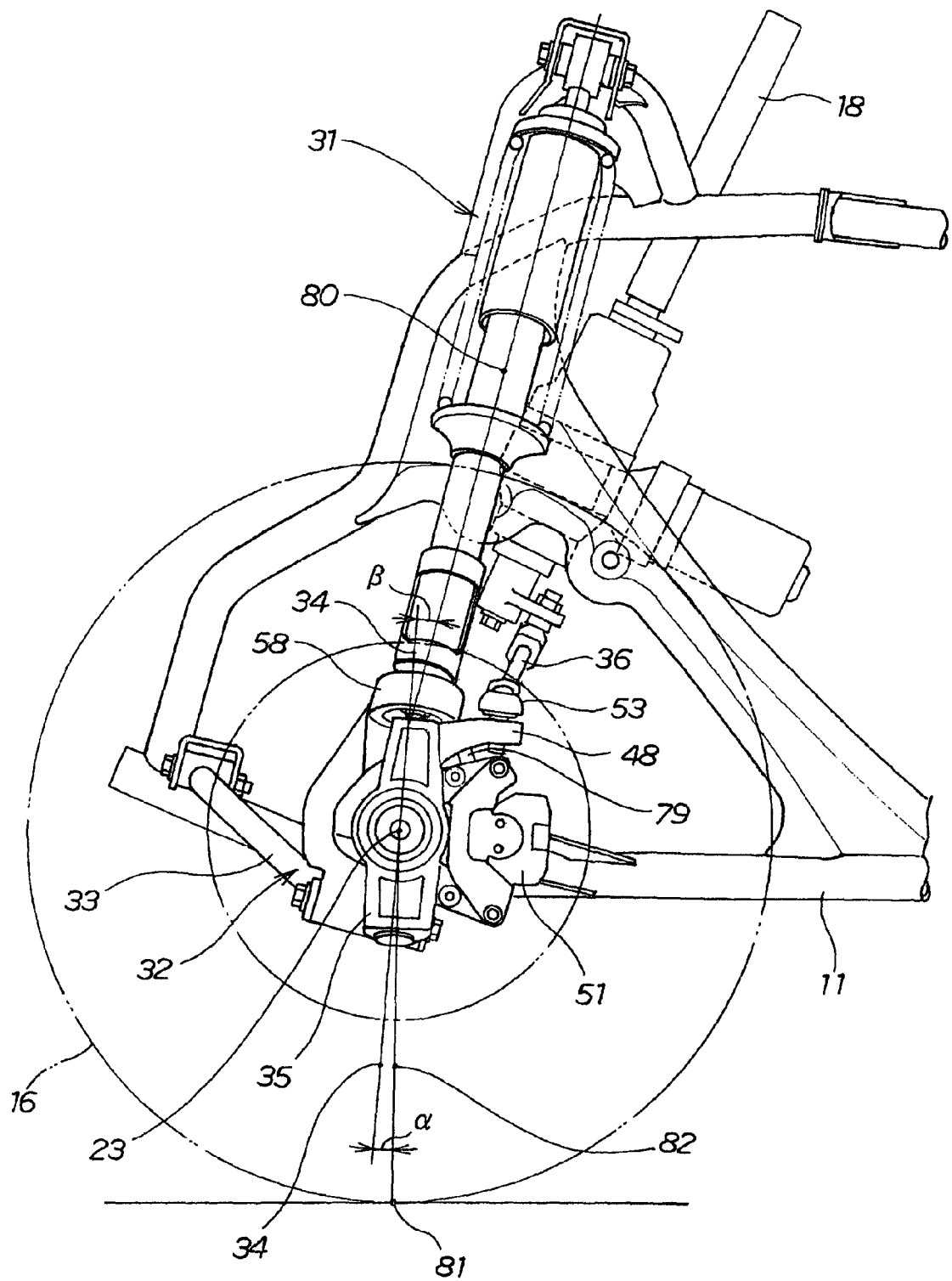
FIG. 5 is a side view of the suspension system for the wheel.

In relation to this point, reinforcement of the opening with the reinforcing member 79 ensures that the size of the opening is kept constant, the bridge section 58 can be made smaller in diametral size, and lightening of the knuckle holder 32 can be achieved. Incidentally, the reinforcing member 79 is attached to the knuckle holder 32 in such a manner as to surround the drive shaft 23, as shown in FIG. 5.

Besides, in the case where the knuckle holder 32 is opened to the front side of the vehicle, the reinforcing member 79 is attached to the vehicle front side of the knuckle holder 32.

Now, characteristic configuration and operation of the present invention will be described below.

In the first place, the present invention assumes a vehicle which, as shown in FIG. 1, includes the body frame 11 and the power generating engine 12 mounted to the body frame 11 and operable to generate power, and which, as shown in FIG. 2, includes the strut dampers 31 connected at their upper ends to the body frame 11 and extending downward, the knuckle holders 32 each mounted to a lower portion of the strut damper 31, the lower arms 33 each extending in the vehicle width direction and connecting a lower portion of the knuckle holder 32 to the body frame 11, and the knuckles 35 each turnably mounted to the knuckle holder 32 through the upper and lower kingpins 76, 73 and supporting the wheel 16.

Besides, as shown in FIG. 2, a lower end portion 31a of the strut damper 31 is located on the upper side of the upper kingpin 76, and a gap having a predetermined length L is provided between the lower end portion 31a of the strut damper 31 and an upper surface of the upper kingpin 76.

The length L of the gap is so sized that a fastening tool represented by a wrench can be inserted from the outside of the vehicle through the gap. As a result, the bolt 76 provided as the upper kingpin can be turned by the fastening tool.

Figure 4:
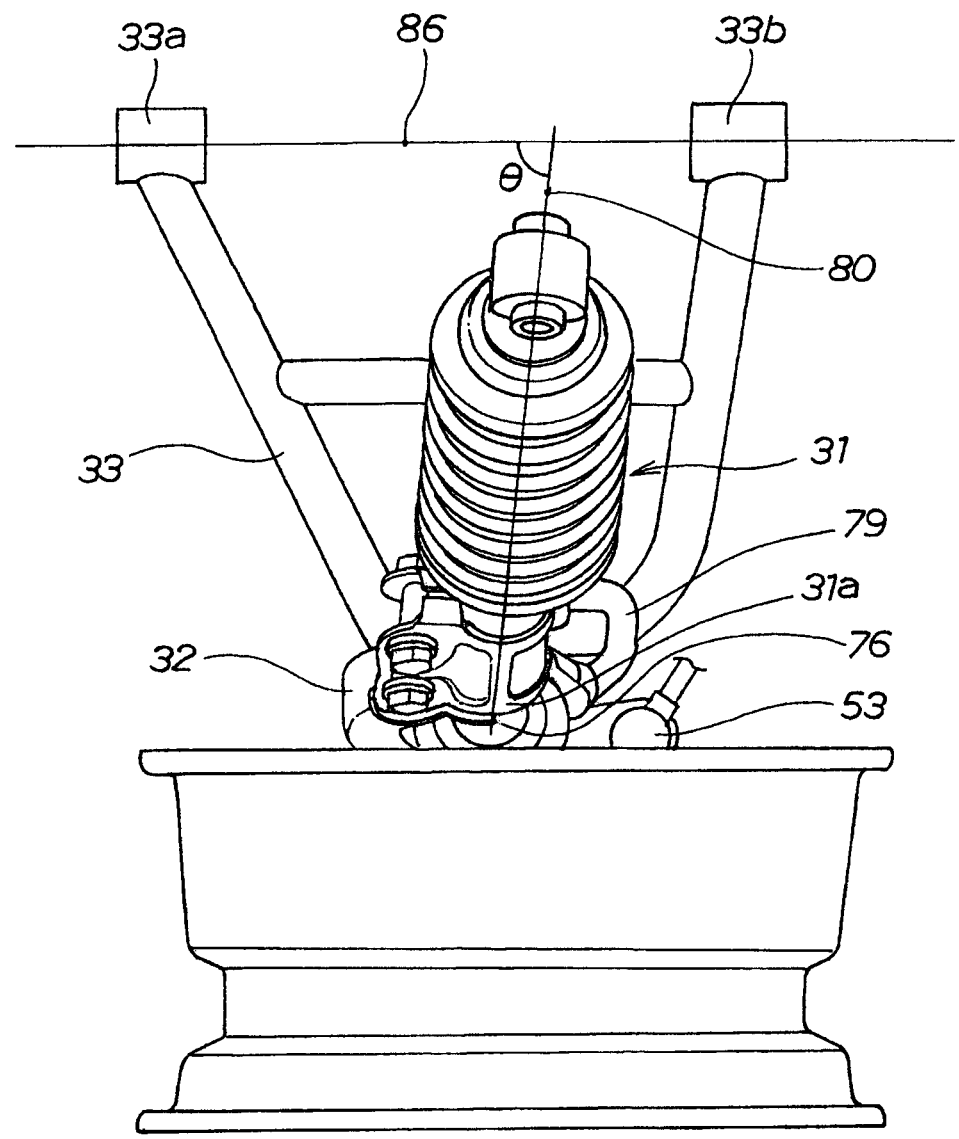
FIG. 4 is a plan view of the suspension system for the wheel.

In addition, as shown in FIG. 4, in plan view, at least a part of the upper kingpin 76 is overlapping with the lower end portion 31a of the strut damper 31.

Consequently, as shown in FIG. 2, a kingpin axis 34 constituting the center axis of the upper and lower kingpins 76, 73 is located close to a strut damper axis 80 constituting the center axis of the strut damper 31.

This ensures that a reaction force from a road surface is inputted to the strut damper 31 substantially along the strut damper axis 80. Since little bending force is exerted on the strut damper 31, the strut damper 31 can be designed to be small in diametral size; therefore, the strut damper 31 can be lighter in weight.

Furthermore, the strut damper 31 is provided, on the inner side in the vehicle width direction relative to the strut damper axis 80, with the damper-side connection section 43 for connection to the knuckle holder 32. On the other hand, the knuckle holder 32 is provided with the holder-side connection section 60 in the inner side in the vehicle width direction relative to the kingpin axis 34. The damper-side connection section 43 is fastened to the holder-side connection section 60 by the bolts 64, 64.

Since the damper-side connection section 43 and the holder-side connection section 60 are disposed on the inner side in the vehicle width direction (on the vehicle body center side) relative to the wheel 16, it is ensured that the damper-side connection section 43 and the holder-side connection section 60 are less liable to interfere with the wheel 16. As a result, it is possible to dispose the strut damper 31 closer to the side of the road surface reaction force input point, and hence to reduce the bending load on the strut damper 31, while obviating the interference of the strut damper 31 with the wheel 16.

Preferably, in front view of the vehicle, the strut damper axis 80 is disposed to be along an imaginary line 85 formed by imaginarily interconnecting an intersection 83 at which a vertical line 82 passing through a grounding point 81 of the wheel 16 intersects an extension line of the lower arm 33 and a connection point 84 at which the strut damper 31 is connected to the vehicle body 11. In FIG. 2, the strut damper axis 80 is substantially along the imaginary line 85. Taking into account effective transmission of the road surface reaction force to the strut damper 31, it is desirable to set the strut damper 80 to overlap with the imaginary line 85.

This ensures that the road surface reaction force can be absorbed by the strut damper 31 and, simultaneously, the bending load on the strut damper 31 can be reduced. Consequently, it is unnecessary to provide the strut damper 31 with an excessively high rigidity, so that reductions in weight and size of the strut damper 31 can be promoted.

Further, preferably, as shown in FIG. 2, the strut damper axis 80 is inclined in such a manner that its upper portion intersects the imaginary line 85 and its lower portion is spaced from the imaginary line 85 toward the inner side in the vehicle width direction (toward the vehicle body center side).

With the strut damper axis 80 inclined toward the inner side in the vehicle width direction in relation to the imaginary line 85, the strut damper 31 can be set closer to a vertical state, while obviating its interference with the wheel 16.

Meanwhile, as shown in FIG. 4, the lower arm 33 is so disposed that the lower arm 33 is connected to the body frame (symbol 11 in FIG. 2) at two parts thereof, namely, a front mounting section 33a and a rear mounting section 33b, and that the strut damper axis 80 is substantially orthogonal to a longitudinal line 86 interconnecting the front mounting section 33a and the rear mounting section 33b. The expression "substantially orthogonal" means that the intersection angle θ is within the range of 90°±10°; in this example, θ is about 84°.

In addition, as shown in FIG. 5, in side view of the vehicle, the kingpin axis 34 is inclined at an inclination angle α relative to a vertical line 82 passing through the grounding point 81 of the wheel 16 so that its upper portion is located on the vehicle rear side in relation to the vertical line 82. Furthermore, the strut damper axis 80 is inclined at an inclination angle β relative to the kingpin axis 34 so that its upper portion is located on the vehicle rear side in relation to the kingpin axis 34.

In FIG. 5, when the front wheel 16 rides onto an object on a road, the reaction force from the object is directed substantially into the strut damper axis 80. In other words, the reaction force inputted to the wheel 16 from the vehicle front side during forward running of the vehicle can be effectively absorbed into the strut damper 31.

Besides, if the kingpin axis 34 is overlapping with the vertical line 82, an effort to achieve steering would be the lightest. In this case, however, it is difficult to smoothly transmit the input from the vehicle front side to the strut damper 31.

If the kingpin axis 34 is inclined forwardly downward at the angle α, the input from the vehicle front side can be smoothly transmitted to the strut damper 31, without making the effort to achieve steering much heavier.

Thus, the configuration as shown in FIGS. 4 and 5 ensures that the reaction force inputted to the wheel 16 from the vehicle front side during forward running of the vehicle can be effectively absorbed into the strut damper 31, while lightening the effort to achieve steering.

Incidentally, while the suspension system has been applied to an all terrain vehicle in the above-described embodiment, the suspension system may be applied to other small-type vehicles and general vehicles.

The suspension system is preferable for application to all terrain vehicles.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A vehicle, comprising:
   a body frame;
   a power generating engine mounted to the body frame and operable to generate power;
   a plurality of strut dampers, each strut damper being connected at an upper end thereof to said body frame and extending downward;
   a plurality of arched knuckle holders, each arched knuckle holder being mounted to a lower portion of said strut damper and being opened to a vehicle front side or rear side, lower arms of each said arched knuckle holder extending in a vehicle width direction and connecting a lower portion of said arched knuckle holder to said body frame; and
   a plurality of knuckles, each knuckle being turnably connected to said arched knuckle holder through upper and lower kingpins and supporting a wheel,
   wherein a lower end portion of said strut damper is located on an upper side of said upper kingpin, and
   wherein at least a part of said upper kingpin overlaps with a lower end portion of said strut damper in plan view.

2. The vehicle according to claim 1,
   wherein said strut dampers include a damper-side connection section for connection to said knuckle holder, on an inner side in the vehicle width direction, relative to a strut damper axis,
   wherein said arched knuckle holders include a holder-side connection section on an inner side in the vehicle width direction, relative to a kingpin axis, and
   wherein said damper-side connection section is fastened to said holder-side connection section.

3. The vehicle according to claim 2, wherein a gap with a predetermined length is provided between said lower end portion of said strut damper and an upper surface of said upper kingpin.

4. The vehicle according to claim 3, wherein, in front view of the vehicle, the strut damper axis is disposed to be along an imaginary line formed by imaginarily interconnecting (i) an intersection at which a vertical line passing through a grounding point of the wheel intersects an extension line of said lower arm, and (ii) a connection point at which said strut damper is connected to the vehicle body.

5. The vehicle according to claim 3,
wherein in front view of the vehicle, the strut damper axis is disposed to be substantially along an imaginary line formed by imaginarily interconnecting (i) an intersection at which a vertical line passing through a grounding point of the wheel intersects an extension line of said lower arm, and (ii) a connection point at which said strut damper is connected to the vehicle body; and
wherein the strut damper axis is inclined such that an upper portion thereof intersects the imaginary line and a lower portion thereof is spaced from the imaginary line toward the inner side, in the vehicle width direction.

6. The vehicle according to claim 5,
wherein said lower arm is connected to the body frame at two parts thereof consisting of a front mounting section and a rear mounting section;
wherein the strut damper axis is substantially orthogonal to a longitudinal line interconnecting said front mounting section and said rear mounting section; and
wherein in side view of the vehicle, the kingpin axis is inclined relative to a vertical line passing through a grounding point of the wheel so that the upper portion thereof is located on the vehicle rear side in relation to the vertical line; and
wherein the strut damper axis is inclined relative to the kingpin axis so that the upper portion thereof is located on the vehicle rear side in relation to the kingpin axis.

7. The vehicle according to claim 2, wherein, in front view of the vehicle, the strut damper axis is disposed to be along an imaginary line formed by imaginarily interconnecting (i) an intersection at which a vertical line passing through a grounding point of the wheel intersects an extension line of said lower arm, and (ii) a connection point at which said strut damper is connected to the vehicle body.

8. The vehicle according to claim 2,
wherein in front view of the vehicle, the strut damper axis is disposed to be substantially along an imaginary line formed by imaginarily interconnecting (i) an intersection at which a vertical line passing through a grounding point of the wheel intersects an extension line of said lower arm, and (ii) a connection point at which said strut damper is connected to the vehicle body; and
wherein the strut damper axis is inclined such that an upper portion thereof intersects the imaginary line and a lower portion thereof is spaced from the imaginary line toward the inner side, in the vehicle width direction.

9. The vehicle according to claim 8,
wherein said lower arm is connected to the body frame at two parts thereof consisting of a front mounting section and a rear mounting section;
wherein the strut damper axis is substantially orthogonal to a longitudinal line interconnecting said front mounting section and said rear mounting section; and
wherein in side view of the vehicle, the kingpin axis is inclined relative to a vertical line passing through a grounding point of the wheel so that the upper portion thereof is located on the vehicle rear side in relation to the vertical line; and
wherein the strut damper axis is inclined relative to the kingpin axis so that the upper portion thereof is located on the vehicle rear side in relation to the kingpin axis.

10. The vehicle according to claim 2,
wherein said knuckle has a knuckle upper arm at an upper portion thereof and a knuckle lower arm at a lower portion thereof;
wherein said arched knuckle holder has an upper shaft support section for rotatably supporting said knuckle upper arm and a lower shaft support section for rotatably supporting said knuckle lower arm;
wherein said knuckle upper arm is put into contact with said upper shaft support section from below and is rotatably fastened to said upper shaft support section by a bolt inserted along a kingpin axis from above; and
wherein said knuckle lower arm is put into contact with said lower shaft support section from below and is rotatably fastened to said lower shaft support section by a dowel inserted along the kingpin axis from below.

11. The vehicle according to claim 2, wherein a detachable reinforcing member is mounted to an opening of said arched knuckle holder, which has an arched shape opened to the front or rear side of the vehicle.

12. The vehicle according to claim 1, wherein a gap with a predetermined length is provided between said lower end portion of said strut damper and an upper surface of said upper kingpin.

13. The vehicle according to claim 12, wherein, in front view of the vehicle, the strut damper axis is disposed to be along an imaginary line formed by imaginarily interconnecting (i) an intersection at which a vertical line passing through a grounding point of the wheel intersects an extension line of said lower arm, and (ii) a connection point at which said strut damper is connected to the vehicle body.

14. The vehicle according to claim 12,
wherein in front view of the vehicle, the strut damper axis is disposed to be substantially along an imaginary line formed by imaginarily interconnecting (i) an intersection at which a vertical line passing through a grounding point of the wheel intersects an extension line of said lower arm, and (ii) a connection point at which said strut damper is connected to the vehicle body; and
wherein the strut damper axis is inclined such that an upper portion thereof intersects the imaginary line and a lower portion thereof is spaced from the imaginary line toward the inner side, in the vehicle width direction.

15. The vehicle according to claim 14,
wherein said lower arm is connected to the body frame at two parts thereof consisting of a front mounting section and a rear mounting section;
wherein the strut damper axis is substantially orthogonal to a longitudinal line interconnecting said front mounting section and said rear mounting section; and
wherein in side view of the vehicle, the kingpin axis is inclined relative to a vertical line passing through a grounding point of the wheel so that the upper portion thereof is located on the vehicle rear side in relation to the vertical line; and
wherein the strut damper axis is inclined relative to the kingpin axis so that the upper portion thereof is located on the vehicle rear side in relation to the kingpin axis.

16. The vehicle according to claim 1, wherein, in front view of the vehicle, a strut damper axis is disposed to be along an imaginary line formed by imaginarily interconnecting (i) an intersection at which a vertical line passing through a grounding point of the wheel intersects an extension line of said lower arm, and (ii) a connection point at which said strut damper is connected to the vehicle body.

17. The vehicle according to claim 1,
wherein in front view of the vehicle, a strut damper axis is disposed to be substantially along an imaginary line formed by imaginarily interconnecting (i) an intersection at which a vertical line passing through a grounding point of the wheel intersects an extension line of said lower arm, and (ii) a connection point at which said strut damper is connected to the vehicle body; and
wherein the strut damper axis is inclined such that an upper portion thereof intersects the imaginary line and a lower portion thereof is spaced from the imaginary line toward the inner side, in the vehicle width direction.

18. The vehicle according to claim 17,
wherein said lower arm is connected to the body frame at two parts thereof consisting of a front mounting section and a rear mounting section;
wherein the strut damper axis is substantially orthogonal to a longitudinal line interconnecting said front mounting section and said rear mounting section; and
wherein in side view of the vehicle, a kingpin axis is inclined relative to a vertical line passing through a grounding point of the wheel so that the upper portion thereof is located on the vehicle rear side in relation to the vertical line; and
wherein the strut damper axis is inclined relative to the kingpin axis so that the upper portion thereof is located on the vehicle rear side in relation to the kingpin axis.

19. The vehicle according to claim 1,
wherein said knuckle has a knuckle upper arm at an upper portion thereof and a knuckle lower arm at a lower portion thereof;
wherein said arched knuckle holder has an upper shaft support section for rotatably supporting said knuckle upper arm and a lower shaft support section for rotatably supporting said knuckle lower arm;
wherein said knuckle upper arm is put into contact with said upper shaft support section from below and is rotatably fastened to said upper shaft support section by a bolt inserted along a kingpin axis from above; and
wherein said knuckle lower arm is put into contact with said lower shaft support section from below and is rotatably fastened to said lower shaft support section by a dowel inserted along the kingpin axis from below.

20. The vehicle according to claim 1, wherein a detachable reinforcing member is mounted to an opening of said arched knuckle holder, which has an arched shape opened to the front or rear side of the vehicle.

* * * * *